(12) United States Patent
Lin

(10) Patent No.: US 12,016,022 B2
(45) Date of Patent: Jun. 18, 2024

(54) FEEDBACK TIMING DETERMINATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 543 days.

(21) Appl. No.: 17/192,616

(22) Filed: Mar. 4, 2021

(65) Prior Publication Data

US 2021/0204275 A1    Jul. 1, 2021

Related U.S. Application Data

(63) Continuation of application No. PCT/CN2018/106010, filed on Sep. 17, 2018.

(51) Int. Cl.
*H04W 72/21* (2023.01)
*H04W 72/0446* (2023.01)
*H04L 5/00* (2006.01)

(52) U.S. Cl.
CPC ....... *H04W 72/21* (2023.01); *H04W 72/0446* (2013.01); *H04L 5/0091* (2013.01)

(58) Field of Classification Search
CPC .............. H04W 72/21; H04W 72/0446; H04L 1/1854; H04L 1/1896; H04L 5/0082; H04L 5/0091

(Continued)

(56) References Cited

U.S. PATENT DOCUMENTS

2013/0070689 A1   3/2013  Liu et al.
2018/0124773 A1   5/2018  Lee et al.
(Continued)

FOREIGN PATENT DOCUMENTS

CN    106559198 A    4/2017
CN    107733558 A    2/2018
(Continued)

OTHER PUBLICATIONS

3GPP TSG RAN WG1 Meeting #90bis—R1-1718034—Prague, CZ, Oct. 9-13, 2017—OPPO, Discussion on HARQ-ACK transmission (4 pages).

(Continued)

*Primary Examiner* — Rownak Islam
(74) *Attorney, Agent, or Firm* — PERKINS COIE LLP

(57) ABSTRACT

Disclosed are a feedback timing determination method, a terminal device, and a network device. Said method includes: receiving first instruction information for instructing the terminal to transmit UCI in a third time unit within a first time unit; the third time unit being subsequent to the first time unit; receiving second instruction information for instructing the terminal to transmit UCI in a fourth time unit within a second time unit; the fourth time unit being subsequent to the second time unit subsequent to the first time unit or the same as the first time unit, the fourth time unit being different from the third time unit; and based on at least one of the first time unit, the second time unit, the first instruction information, and the second instruction information, determining to transmit UCI in the fourth time unit and not to transmit the UCI in the third time unit.

17 Claims, 4 Drawing Sheets

(58) Field of Classification Search
USPC .......................................................... 370/336
See application file for complete search history.

(56) References Cited

U.S. PATENT DOCUMENTS

| 2018/0132264 | A1  | 5/2018 | Jung et al. |
| 2020/0137752 | A1* | 4/2020 | Parkvall ................ H04W 72/21 |
| 2021/0075556 | A1* | 3/2021 | Karaki ................. H04B 7/0456 |
| 2022/0264550 | A1* | 8/2022 | Cheng ............... H04W 72/0446 |

FOREIGN PATENT DOCUMENTS

| CN | 108370582 A   | 8/2018 |
| WO | 2014046374 A1 | 3/2014 |

OTHER PUBLICATIONS

3GPP TSG RAN WG1 Meeting #94—R1-1808063—Gothenburg, Sweden, Aug. 20-Aug. 24, 2018—Huawei, HiSilicon, HARQ enhancements in NR unlicensed (8 pages).
3GPP TSG RAN WG1 Meeting #94—R1-1808276—Gothenburg, Sweden, Aug. 20-24, 2018—MediaTek Inc., Enhancements on HARQ for NR-U operation (4 pages).
International Search Report dated Jun. 18, 2019 of PCT/CN2018/106010 (5 pages).
EPO, Partial Supplementary European Search Report for European Application No. 18934253.8. dated Jul. 26, 2021. 21 pages.
Ericsson "On PUCCH Resource Allocation and Other Open Aspects" R1-1716590; 3GPP TSG RAN WG1 Meeting NR#3. 13 pages.
Huawei et al. "Discussion on UCI feedback for URLLC" R1-1800054; 3GPP TSF RAN WG1 Ad Hoc Meeting; Jan. 22-26, 2018. 13 pages.
NTT DOCOMO, Inc. "DL/UL scheduling and HARQ management" R1-1800676; 3GPP TSF RAN WG1 Meeting AH 1801; Jan. 22-26, 2018. 6 pages.
Examination Report for European Application No. 18934253.8 dated Feb. 2, 2023. 5 pages.
First Office Action for Chinese Application No. 202210144739.4 dated Feb. 23, 2023. 12 pages with English translation.
Notice of Refusal for Taiwanese Application No. 108132868 dated Mar. 13, 2023. 3 pages with English translation.
Huawei et al. "Feature lead summary of HARQ enhancement in NR-U" R1-1809921; 3GPP TSG RAN WG1 Meeting #94; Gothenburg, Sweden; Aug. 20-24, 2018. 7 pages.
Extended European Search Report for European Application No. 18934253.8 dated Apr. 20, 2022. 29 pages.
Ericsson "On HARQ Management" R1-1716595; 3GPP TSG RAN WG1 Meeting NR#3; Nagoya, Japan; Sep. 18-21, 2017. 9 pages.
Huawei et al. "HARQ enhancements in NR unlicensed" R1-1805918; 3GPP TSG RAN WG1 Meeting #93; Busan, Korea, May 21-25, 2018. 5 pages.
MediaTek Inc. "Remaining issues in carrier aggregation" R1-1806776; 3GPP TSG RAN WG1 Meeting #93; Busan, Korea; May 21-25, 2018. 12 pages.
ZTE et al. "URLLC PHY enhancements" R1-1808211; 3GPP TSG RAN WG1 Meeting #94; Gothenburg, Sweden; Aug. 20-24, 2018. 10 pages.
First Office Action for Taiwanese Application No. 108132868 dated Nov. 7, 2022. 6 pages with English translation.
Second Office Action of the European application No. 18934253.8, issued on Feb. 28, 2024. 5 pages.

* cited by examiner

FEEDBACK TIMING DETERMINATION METHOD, TERMINAL DEVICE, AND NETWORK DEVICE

CROSS-REFERENCE TO RELATED APPLICATION

The present application is a continuation application of International PCT Application No. PCT/CN2018/106010, filed on Sep. 17, 2018, the entire content of which is hereby incorporated by reference.

TECHNICAL FIELD

The present disclosure relates to the technical field of information processing, in particular to a method for determining a feedback time sequence, a terminal device, a network device, a chip, a computer-readable storage medium, a computer program product and a computer program.

BACKGROUND

An unlicensed spectrum is a spectrum classified by countries and regions that is available to communication of radio devices. This spectrum is generally regarded as a shared spectrum, that is, communication devices in different communication systems may use this spectrum without applying for exclusive spectrum authority from the government, as long as they meet the regulatory requirements set by countries or regions on this spectrum. In order to ensure fairness, in one transmission, a duration in which a communication device uses a channel on the unlicensed spectrum for a signal transmission cannot exceed Maximum Channel Occupation Time (MCOT). With the development of wireless communication technology, an LTE system and an NR system will both consider deploying a network on the unlicensed spectrum so as to use the unlicensed spectrum for a data service transmission.

In NR Rel15, when HARQ-timings corresponding to multiple Physical Downlink Shared Channels (PDSCHs) are a same slot, ACK/NACK information of the multiple PDSCHs is multiplexed and transmitted by one UCI. However, the current processing method may cause problems that transmission is discontinuous, use of LBT is increased, and system efficiency is reduced.

SUMMARY

In order to solve the above technical problem, implementations of the present disclosure provide a method for determining a feedback time sequence, a terminal device, a network device, a chip, a computer-readable storage medium, a computer program product and a computer program.

In a first aspect, an implementation of the present disclosure provides a method for determining a feedback time sequence, which is applied to a terminal device, including: receiving first indication information within a first time unit, wherein the first indication information is used for indicating a terminal to transmit Uplink Control Information (UCI) in a third time unit, and the third time unit is subsequent to the first time unit; receiving second indication information within a second time unit, wherein the second indication information is used for indicating the terminal to transmit the UCI in a fourth time unit, the fourth time unit is subsequent to the second time unit, the second time unit is subsequent to the first time unit or the same as the first time unit, and the fourth time unit is different from the third time unit; and determining to transmit the UCI in the fourth time unit and not to transmit the UCI in the third time unit, based on at least one of the first time unit, the second time unit, the first indication information and the second indication information.

In a second aspect, an implementation of the present disclosure provides a method for determining a feedback time sequence, which is applied to a network device, including: sending first indication information to a terminal device within a first time unit, wherein the first indication information is used for indicating the terminal device to transmit UCI in a third time unit, and the third time unit is subsequent to the first time unit; and sending second indication information to the terminal device within a second time unit, wherein the second indication information is used for indicating the terminal device to transmit the UCI in a fourth time unit, the fourth time unit is subsequent to the second time unit, the second time unit is subsequent to the first time unit, and the fourth time unit is different from the third time unit.

The method further includes: indicating the terminal device to transmit the UCI in the fourth time unit and not to transmit the UCI in the third time unit, based on at least one of the first time unit, the second time unit, the first indication information, and the second indication information.

In a third aspect, an implementation of the present disclosure provides a terminal device, including: a first communication unit, configured to receive first indication information within a first time unit, wherein the first indication information is used for indicating a terminal to transmit Uplink Control Information (UCI) in a third time unit, and the third time unit is subsequent to the first time unit; and receive second indication information within a second time unit, wherein the second indication information is used for indicating the terminal to transmit the UCI in a fourth time unit, the fourth time unit is subsequent to the second time unit, the second time unit is subsequent to the first time unit or the same as the first time unit, and the fourth time unit is different from the third time unit; and a first processing unit, configured to determine to transmit the UCI in the fourth time unit and not to transmit the UCI in the third time unit, based on at least one of the first time unit, the second time unit, the first indication information, and the second indication information.

In a fourth aspect, an implementation of the present disclosure provides a network device, including: a second communication unit, configured to send first indication information to a terminal device within a first time unit, wherein the first indication information is used for indicating the terminal device to transmit UCI in a third time unit, and the third time unit is subsequent to the first time unit; and send second indication information to the terminal device within a second time unit, wherein the second indication information is used for indicating the terminal device to transmit the UCI in a fourth time unit, the fourth time unit is subsequent to the second time unit, the second time unit is subsequent to the first time unit, and the fourth time unit is different from the third time unit; and a second processing unit, configured to determine to indicate the terminal device to transmit the UCI in the fourth time unit and not to transmit the UCI in the third time unit, based on at least one of the first time unit, the second time unit, the first indication information, and the second indication information.

In a fifth aspect, a terminal device is provided, including a processor and a memory. The memory is configured to store a computer program, and the processor is configured to call and run the computer program stored in the memory to execute the method in the above first aspect or in various implementation modes thereof.

In a sixth aspect, a network device is provided, including a processor and a memory. The memory is configured to store a computer program, and the processor is configured to call and run the computer program stored in the memory to execute the method in the above second aspect or in various implementation modes thereof.

In a seventh aspect, a chip is provided, configured to implement the method in any one of the above first to second aspects or in various implementation modes thereof.

Specifically, the chip includes a processor, configured to call and run a computer program from a memory, to cause a device in which the chip is installed to perform the method in any one of the above first to second aspects or in various implementation modes thereof.

In an eighth aspect, a computer-readable storage medium is provided, configured to store a computer program, wherein the computer program causes a computer to perform the method in any one of the above first to second aspects or in various implementation modes thereof.

In a ninth aspect, a computer program product is provided, including computer program instructions, wherein the computer program instructions cause a computer to perform the method in any one of the above first to second aspects or in various implementation modes thereof.

In a tenth aspect, a computer program is provided, causing, when being run on a computer, the computer to perform the method in any one of the above first to second aspects or in various implementation modes thereof.

DETAILED DESCRIPTION

Technical solutions in implementations of the present disclosure will be described below with reference to drawings in implementations of the present disclosure. It is apparent that the implementations described are just a part of implementations of the present disclosure, but not all implementations of the present disclosure. According to the implementations of the present disclosure, all other implementations achieved by a person of ordinary skills in the art without paying an inventive effort belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Figure 1:
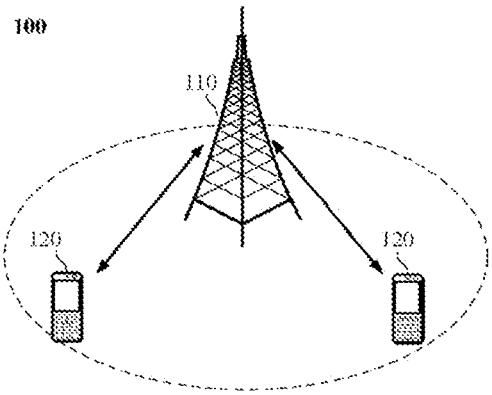
FIG. 1 is a first schematic diagram of architecture of a communication system according to an implementation of the present disclosure.

Illustratively, a communication system 100 applied in an implementation of the present disclosure may be as shown in FIG. 1. The communication system 100 may include a network device 110, wherein the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, an apparatus, configured to receive/send a communication signal, via a wired line connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal which may combine a cellular radio telephone and data processing, faxing, or data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network may also be called a New Radio (NR) system or an NR network.

FIG. 1 shows one network device and two terminal devices as an example. Optionally, the communication system 100 may include multiple network devices, and another quantity of terminal devices may be included within a coverage area of each network device, which is not limited in the implementations of the present disclosure.

Optionally, the communication system 100 may further include another network entity such as a network controller, a mobile management entity, etc., which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have a communication function, and the network device 110 and the terminal device 120 may be the specific devices described above, which will not be repeated here again. The communication devices may also include other devices in the communication system 100, e.g., other network entities such as a network controller, a mobile management entity, etc., which is not limited in the implementations of the present disclosure.

It should be understood that the terms "system" and "network" in this document are often used interchangeably herein. The term "and/or" herein is merely an association relationship describing associated objects, indicating that there may be three relationships, for example, A and/or B may indicate three cases: A alone, both A and B, and B alone. In addition, the symbol "/" herein generally indicates that objects before and after the symbol "/" have an "or" relationship.

In order to be able to learn features and technical contents of implementations of the present disclosure in more detail, implementation modes of the implementations of the present disclosure will be repeated below with reference to accompanying drawings, and the accompanying drawings are used for reference only and are not used for limiting the implementations of the present disclosure.

First Implementation

Figure 2:
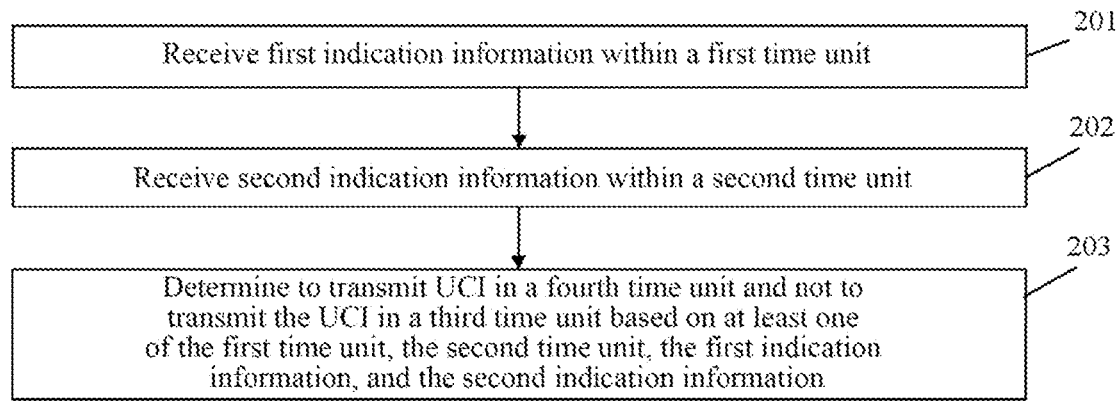
FIG. 2 is a first schematic flow diagram of a method for determining a feedback time sequence according to an implementation of the present disclosure.

An implementation of the present disclosure provides a method for determining a feedback time sequence, which is applied to a terminal device, as shown in FIG. 2, including acts 201 to 203.

In act 201, first indication information is received within a first time unit, wherein the first indication information is used for indicating a terminal to transmit Uplink Control Information (UCI) in a third time unit, and the third time unit is subsequent to the first time unit.

In act 202, second indication information is received within a second time unit, wherein the second indication information is used for indicating the terminal to transmit the UCI in a fourth time unit, the fourth time unit is subsequent to the second time unit, the second time unit is subsequent to the first time unit or the same as the first time unit, and the fourth time unit is different from the third time unit.

In act 203, it is determined to transmit the UCI in the fourth time unit and not to transmit the UCI in the third time unit, based on at least one of the first time unit, the second time unit, the first indication information, and the second indication information.

Herein, the UCI may be transmitted by a Physical Uplink Control Channel (PUCCH) or by a Physical Uplink Shared Channel (PUSCH). In actual processing, there may also be another transmission channel, which will not be exhaustively listed in the present implementation. The UCI is ACK/NACK information corresponding to downlink data. That is, the UCI is ACK/NACK information corresponding to downlink data received aiming at previous multiple time units.

The first indication information and/or the second indication information is downlink control signaling, which, for example, may be DCI.

The aforementioned determining to transmit the UCI in the fourth time unit and not to transmit the UCI in the third time unit, based on at least one of the first time unit, the second time unit, the first indication information and the second indication information may include at least one of the following determination conditions.

First Determination Condition

It is determined to transmit the UCI in the fourth time unit and not to transmit the UCI in the third time unit, according to a Downlink Assignment Index (DAI) in the second indication information and the first indication information.

Specifically, a value of the DAI in the first indication information is added by 1 and then an operation of the value of the DAI plus 1 modulo a first numerical value is performed to obtain a first result; and when a value of the DAI in the second indication information is equal to the first result, it is determined to transmit the UCI in the fourth time unit and not to transmit the UCI in the third time unit.

Herein, a DAI field is used for telling a UE how many subframes or time units within an HARQ feedback window contain a downlink transmission. In HARQ, this may help the terminal device detect whether downlink DCI is lost. In HARQ multiplexing, DAI may help the UE determine how many bits of ACK/NACK information need to be fed back. That is, by a value of the DAI field, a result obtained by adding the DAI indicated in the first indication information by 1 and then performing an operation of the value of the DAI plus 1 modulo the first numerical value may be known, and when the result is compared with the DAI in the second indication information, if they are same, it represents that the two pieces of indication information have a same content. Therefore, it may be determined that the UCI does not need to be transmitted in the third time unit, but is transmitted only in the fourth time unit.

Further, the first numerical value may be a numerical value preset directly or a numerical value calculated according to a preset formula. Herein, the preset formula may be $A=2^L$, wherein A is the first numerical value and L is a quantity of bits in a DAI information field.

Figure 3A:
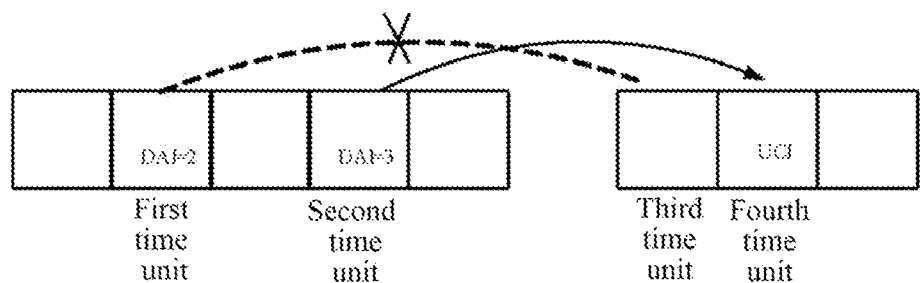
FIG. 3A is a first schematic diagram of a processing scenario according to an implementation of the present disclosure.

In the present implementation, description is made by taking L=2 as an example, that is, A=4. Referring to FIG. 3A, for example, the value of the DAI in the first indication information is 2 and the value of the DAI in the second indication information is 3, then the DAI in the first indication information plus 1 is 3, 3 modulo 4 is still 3, that is, a calculation result is equal to the DAI in the second indication information, then as shown in the figure, the UCI may be transmitted in the fourth time unit, but not in the third time unit.

Figure 3B:
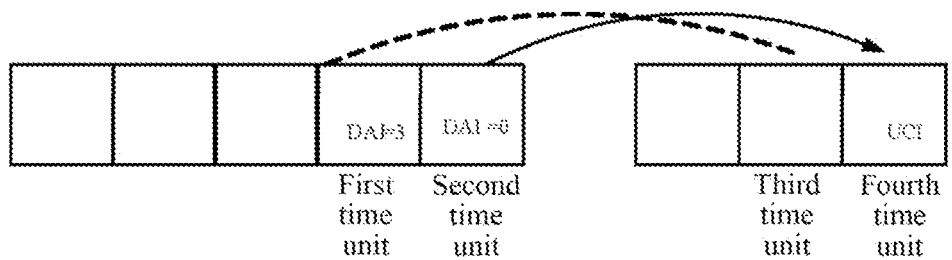
FIG. 3B is a second schematic diagram of a processing scenario according to an implementation of the present disclosure.

In another example, as shown in FIG. 3B, the value of the DAI in the first indication information is 3, 3+1=4, 4 modulo 4 is equal to 0, and the value of the DAI in the second indication information is 0, then the UCI is transmitted in the fourth time unit, but not in the third time unit.

Second Determination Condition

It is determined to transmit the UCI in the fourth time unit and not to transmit the UCI in the third time unit, when the second time unit is antecedent to the third time unit or the second time unit is the same as the third time unit.

That is, when the second time unit is antecedent to the third time unit indicated in the first indication information, it can be considered that a network side re-issues new indication information, then the UCI only needs to be transmitted in the fourth time unit.

Alternatively, when the second time unit is equal to the third time unit, the UCI is not transmitted in the third time unit.

When the second time unit is antecedent to the third time unit, it is further included that: a time difference between the third time unit and the second time unit is not less than a first threshold.

Herein, a value of the first threshold is related to a processing delay, which is not repeated in the present implementation. For example, if the time at which processing is completed in the second time unit is subsequent to the third time unit, a terminal side will be affected in deciding whether the UCI needs to be sent out in the third time unit. Therefore, the time difference between the second time unit and the third time unit is required to be not able to be less than the processing delay.

Of course, the value of the first threshold may also use another reference, for example, may be represented by several time units, which will not be exhaustively listed in the present implementation.

Third Determination Condition

It is determined to transmit the UCI in the fourth time unit and not to transmit the UCI in the third time unit, when a time difference between the second time unit and the first time unit satisfies a predetermined relationship.

Specifically, when the time difference between the second time unit and the first time unit is not greater than a second threshold and/or not less than a third threshold, it is determined to transmit the UCI in the fourth time unit and not to transmit the UCI in the third time unit.

Herein, the second threshold may be related to one transmission duration. For example, the one transmission duration may be L slots, then the second threshold may be L slots. Of course, each transmission duration is not fixed, then a minimum transmission duration may be selected as the second threshold, or an average transmission duration may also be used as the second threshold, which will not be kept on being exhaustively listed here.

Fourth Determination Condition

It is determined to transmit the UCI in the fourth time unit and not to transmit the UCI in the third time unit, when a channel resource for transmitting the UCI indicated by the second indication information is the same as a channel resource for transmitting the UCI indicated by the first indication information.

Taking transmitting the UCI by using a PUCCH as an example, when a PUCCH resource indicated in the second indication information is the same as a PUCCH resource indicated in the first indication information, the UCI is not transmitted in the third time unit, but only in the fourth time unit.

Herein, the channel resource for transmitting the UCI may include another resource than transmission time units, for example, there may be at least one of a frequency domain resource, a code domain resource, a time domain symbol used within one time unit, or the like.

Fifth Determination Condition

It is determined to transmit the UCI in the fourth time unit and not to transmit the UCI in the third time unit, when a value of a specific information field in the second indication information is a preset value.

Herein, the specific information field may be set according to an actual situation, and a quantity of bits it contains may also be set according to an actual situation. The quantity of bits may be related to a quantity of indication information. Taking two pieces of indication information as an example, the specific information field may be set to contain only 1 bit.

The preset value may be a value set according to an actual situation. For example, when a value of the specific information field in the second indication information is set to 1, and 1 is a preset value, then the UCI is transmitted in the fourth time unit and not transmitted in the third time unit.

Alternatively, the preset value may be related to a value of a specific information field in the first indication information. For example, when the value of the specific information field in the second indication information is an inversion of the value of the specific information field in the first indication information, it may be determined that the UCI is transmitted in the fourth time unit and not transmitted in the third time unit. For example, the value of the specific information field in the first indication information is 1 and the value of the specific information field in the second indication information is 0, at which time, it may be determined that the UCI is transmitted in the fourth time unit and not transmitted in the third time unit.

Sixth Determination Condition

It is determined to transmit the UCI in the fourth time unit and not to transmit the UCI in the third time unit, when the second time unit and the first time unit are time units in a continuous time unit set or a continuous downlink time unit set.

That is, the second time unit and the first time unit belong to a same continuous time unit set, wherein the continuous time unit set is a set of time units included in a Channel Occupation Time (COT). Moreover, the continuous time unit set is not necessarily all downlink slots, but may also include an uplink slot.

Of course, the second time unit and the first time unit may also both belong to time units in a continuous downlink time unit set.

In both cases described above, it may be determined that the UCI is transmitted in the fourth time unit, but not in the third time unit.

It should also be pointed out that the first time unit and the second time unit may be a same time unit, or not a same time unit, that is, they are two different time units.

Finally, it should be understood that only one of the above six determination conditions may be used for determination, or the six determination conditions may be used in combination for determination, or only part of the determination conditions may be used for determination, and determination conditions obtained by permutations and combinations thereof are all within the protection scope of the present implementation.

Transmitting the UCI in the fourth time unit and not transmitting the UCI in the third time unit includes: information carried within the UCI transmitted in the fourth time unit including at least part of information carried by the UCI transmitted in the third time unit.

That is, a content of the UCI transmitted in the fourth time unit may be completely the same as a content intended to be transmitted in the third time unit, or a content of the UCI to be transmitted in the fourth time unit may be more than the content of the UCI to be transmitted in the third time unit. For example, when the UCI to be transmitted in the fourth time unit needs to contain feedback information within the previous multiple downlink time units, the content of the UCI to be transmitted in the fourth time unit may be more than a content of information to be fed back in the third time unit, so a content transmitted in the fourth time unit may be more than a content to be transmitted in the third time unit.

The method further includes: it is determined to transmit the UCI in the third time unit, according to a Hybrid Automatic Repeat reQuest (HARQ) time information field in the first indication information; and/or it is determined to transmit the UCI in the fourth time unit, according to an HARQ time information field in the second indication information.

Specifically, when it is determined to transmit the UCI in the fourth time unit and not to transmit the UCI in the third time unit based on at least one of the first time unit, the second time unit, the first indication information and the second indication information in the present solution, it is determined to transmit the UCI in the fourth time unit only according to the HARQ time information field in the second indication information.

In addition, in actual processing, there may also be the following solutions.

It is determined to transmit the UCI in the fourth time unit and also transmit the UCI in the third time unit, based on at least one of the first time unit, the second time unit, the first indication information and the second indication information. That is, if at least one of the first time unit, the second time unit, the first indication information and the second indication information does not satisfy at least one of the aforementioned six determination conditions, it may be determined that the UCI is transmitted in the fourth time unit and also in the third time unit. At this time, according to the Hybrid Automatic Repeat reQuest (HARQ) time information field in the first indication information, it is determined to transmit the UCI in the third time unit; and according to the HARQ time information field in the second indication information, it is determined to transmit the UCI in the fourth time unit.

In another solution, when only the first indication information is received and the second indication information is not received, it is determined to transmit the UCI in the third time unit, according to the Hybrid Automatic Repeat reQuest (HARQ) time information field in the first indication information.

Finally, it should be pointed out that whether the processing in the present implementation is performed may be determined based on whether configuration information by which the network side indicates to enable performing the above function is received. For example, configuration information sent by the network side is received, and it is determined based on the configuration information, whether to determine to transmit the UCI in the fourth time unit and not to transmit the UCI in the third time unit based on at least one of the first time unit, the second time unit, the first indication information and the second indication information.

Herein, the configuration information may be issued by an RRC or DCI signaling, which is not exhaustively listed here. Herein, a bit may be added to be used for indicating the terminal device whether the above function is enabled, for example, 1 bit may be added for indicating that, and when the bit is set as 1, it is determined to perform the solution provided by the present implementation, otherwise the solution provided by the present implementation is not performed. Of course, it may also be set that the solution provided by the present implementation is performed when the bit is set as 0, otherwise the solution provided by the present implementation is not performed.

Figure 4:
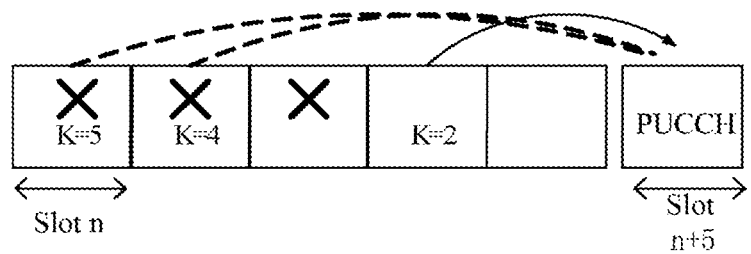
FIG. 4 is a schematic diagram of a feedback time sequence in the prior art.

Processing is performed in a manner specified in NR Rel15. As shown in FIG. 4, when HARQ-timings corresponding to multiple PDSCHs are a same slot, ACK/NACK information of the multiple PDSCHs is multiplexed and transmitted by one PUCCH, wherein the HARQ-timings are dynamically indicated by DCI. In an NR-U system, after a base station prepares data in advance (DCI and PDSCHs have been determined, processing such as encoding, modulation, or the like, has been performed for the DCI and the PDSCHs and the processed DCI and the PDSCHs wait to be sent), it may be caused due to a LBT failure that corresponding data cannot be transmitted. As shown in the figure, slots corresponding to crosses therein indicate that LBT fails and a transmission is not performed, and K indicates a value of HARQ timing in DCI transmitted within the corresponding slot. The network side originally expects to receive uplink feedback after continuously sending 5 downlink slots. However, due to a LBT failure and preparation of HARQ timing within DCI in advance (assuming that preparation needs to be made in advance by 4 slots), then the base station can only send two DL slots after preempting slot n+3, and then needs to stop a downlink transmission and receive a PUCCH assigned in advance. By the solution provided in the present implementation, the third time unit for transmitting the UCI indicated by the first time unit is adjusted based on the second indication information in the second time unit which is subsequent to the first time unit, and finally it can be determined that the UCI is transmitted only in the fourth time unit indicated in the second indication information, but not in the third time unit any more.

As can be seen, by adopting the present implementation, a fourth time unit in which UCI is transmitted can be re-indicated in second indication information in a second time unit subsequent to a first time unit, and further it can be determined that the UCI is only transmitted in the fourth time unit, but not transmitted in a third time unit, based on at least one of the first time unit, the second time unit, first indication information and the second indication information. In this way, an interruption of a transmission at a terminal or base station side due to a LBT failure can be avoided, continuity of a transmission can be ensured, use efficiency of LBT can be increased and system efficiency can be improved.

Second Implementation

Figure 5:
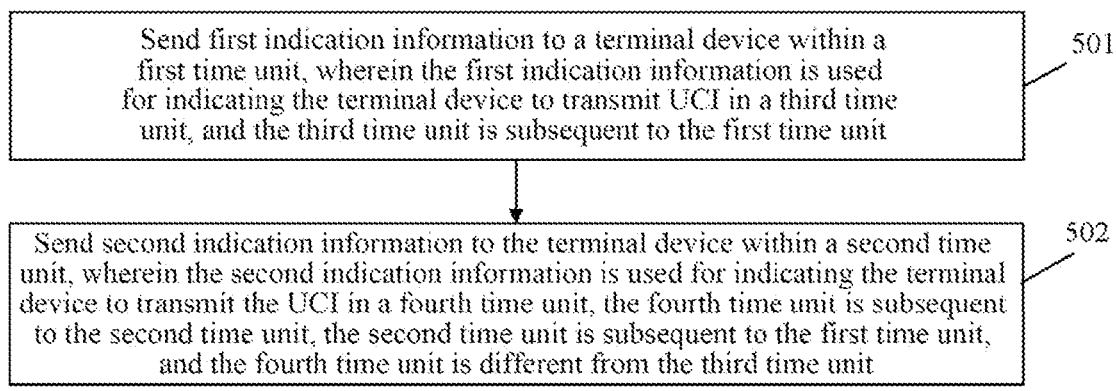
FIG. 5 is a second schematic flow diagram of a method for determining a feedback time sequence according to an implementation of the present disclosure.

An implementation of the present disclosure provides a method for determining a feedback time sequence, which is applied to a network device, as shown in FIG. 5, including acts 501 to 502.

In act 501, first indication information is sent to a terminal device within a first time unit, wherein the first indication information is used for indicating the terminal device to transmit UCI in a third time unit, and the third time unit is subsequent to the first time unit.

In act 502, second indication information is sent to the terminal device within a second time unit, wherein the second indication information is used for indicating the terminal device to transmit the UCI in a fourth time unit, the fourth time unit is subsequent to the second time unit, the second time unit is subsequent to the first time unit, and the fourth time unit is different from the third time unit.

The method further includes: the terminal device is indicated to transmit the UCI in the fourth time unit and not to transmit the UCI in the third time unit, based on at least one of the first time unit, the second time unit, the first indication information, and the second indication information.

That is, the first time unit, the second time unit, the first indication information and the second indication information may be taken as an indication for indicating the terminal device whether to transmit the UCI in the fourth time unit and not transmit the UCI in the third time unit.

Herein, the UCI may be transmitted by a Physical Uplink Control Channel (PUCCH) or by a Physical Uplink Shared Channel (PUSCH). In actual processing, there may also be another transmission channel, which will not be exhaustively listed in the present implementation. The UCI is ACK/NACK information corresponding to downlink data. That is, the UCI is ACK/NACK information corresponding to downlink data received aiming at previous multiple time units.

The first indication information and/or the second indication information is downlink control signaling, which, for example, may be DCI.

The aforementioned indicating the terminal device to transmit the UCI in the fourth time unit and not to transmit the UCI in the third time unit, based on at least one of the first time unit, the second time unit, the first indication information, and the second indication information may include at least one of the following conditions.

First Condition

The terminal device is indicated to transmit the UCI in the fourth time unit and not to transmit the UCI in the third time unit, based on a Downlink Assignment Index (DAI) in the second indication information and the first indication information.

Specifically, a value of the DAI in the first indication information is added by 1 and then an operation of the value of the DAI plus 1 modulo a first numerical value is performed to obtain a first result; and a value of the DAI in the second indication information is set to be equal to the first result, so as to indicate the terminal device to transmit the UCI in the fourth time unit and not to transmit the UCI in the third time unit.

Herein, a DAI field is used for telling a UE how many subframes or time units within an HARQ feedback window contain a downlink transmission. In HARQ, this may help the terminal device detect whether downlink DCI is lost. In HARQ multiplexing, DAI may help the UE determine how many bits of ACK/NACK information need to be fed back. That is, by a value of the DAI field, a result obtained by adding the DAI indicated in the first indication information by 1 and then performing an operation of the value of the DAI plus 1 modulo the first numerical value may be known, and when the result is compared with the DAI in the second indication information, if they are same, it represents that the two pieces of indication information have a same content. Therefore, it may be determined that the UCI does not need to be transmitted in the third time unit, but is transmitted only in the fourth time unit.

Further, the first numerical value may be a numerical value preset directly or a numerical value calculated according to a preset formula. Herein, the preset formula may be $A=2^L$, wherein A is the first numerical value and L is a quantity of bits in a DAI information field. In the present implementation, description is made by taking L=2 as an example, that is, A=4. Referring to FIG. 3A, for example, the value of the DAI in the first indication information is 2 and the value of the DAI in the second indication information is 3, then the DAI in the first indication information plus 1 is 3, 3 modulo 4 is still 3, that is, a calculation result is equal to the DAI in the second indication information, then as shown in the figure, the UCI may be transmitted in the fourth time unit, but not in the third time unit.

In another example, as shown in FIG. 3B, the value of the DAI in the first indication information is 3, 3+1=4, 4 modulo 4 is equal to 0, and the value of the DAI in the second indication information is 0, then the UCI is transmitted in the fourth time unit, but not in the third time unit.

Second Condition

The second time unit is set to be antecedent to the third time unit or the same as the third time unit, so as to indicate the terminal device to transmit the UCI in the fourth time unit and not to transmit the UCI in the third time unit.

That is, when the second time unit is antecedent to the third time unit indicated in the first indication information, it can be considered that a network side re-issues new indication information, then the UCI only needs to be transmitted in the fourth time unit.

Alternatively, when the second time unit is equal to the third time unit, the UCI is not transmitted in the third time unit.

When the second time unit is antecedent to the third time unit, it is further included that: a time difference between the third time unit and the second time unit is not less than a first threshold.

Herein, a value of the first threshold is related to a processing delay, which is not repeated in the present implementation. For example, if the time at which processing is completed in the second time unit is subsequent to the third time unit, a terminal side will be affected in deciding whether the UCI needs to be sent out in the third time unit.

Therefore, the time difference between the second time unit and the third time unit is required to be not able to be less than the processing delay.

Of course, the value of the first threshold may also use another reference, for example, may be represented by several time units, which will not be exhaustively listed in the present implementation.

Third Condition

A time difference between the second time unit and the first time unit is set to satisfy a predetermined relationship, so as to indicate the terminal device to transmit the UCI in the fourth time unit and not to transmit the UCI in the third time unit.

Specifically, when the time difference between the second time unit and the first time unit is not greater than a second threshold and/or not less than a third threshold, it is determined to transmit the UCI in the fourth time unit and not to transmit the UCI in the third time unit.

Herein, the second threshold may be related to one transmission duration. For example, the one transmission duration may be L slots, then the second threshold may be L slots. Of course, each transmission duration is not fixed, then a minimum transmission duration may be selected as the second threshold, or an average transmission duration may also be used as the second threshold, which will not be kept on being exhaustively listed here.

Fourth Condition

A channel resource for transmitting the UCI indicated by the second indication information is set to be the same as a channel resource for transmitting the UCI indicated by the first indication information, so as to indicate the terminal device to transmit the UCI in the fourth time unit and not to transmit the UCI in the third time unit.

Taking transmitting the UCI by using a PUCCH as an example, when a PUCCH resource indicated in the second indication information is the same as a PUCCH resource indicated in the first indication information, the UCI is not transmitted in the third time unit, but only in the fourth time unit.

Herein, the channel resource for transmitting the UCI may include another resource than transmission time units, for example, there may be at least one of a frequency domain resource, a code domain resource, a time domain symbol used within one time unit, or the like.

Fifth Condition

The terminal device is indicated to transmit the UCI in the fourth time unit and not to transmit the UCI in the third time unit, by setting a value of a specific information field in the second indication information to be a preset value.

Herein, the specific information field may be set according to an actual situation, and a quantity of bits it contains may also be set according to an actual situation. The quantity of bits may be related to a quantity of indication information. Taking two pieces of indication information as an example, the specific information field may be set to contain only 1 bit.

The preset value may be a value set according to an actual situation. For example, when a value of the specific information field in the second indication information is set to 1, and 1 is a preset value, then the UCI is transmitted in the fourth time unit and not transmitted in the third time unit.

Alternatively, the preset value may be related to a value of a specific information field in the first indication information. For example, when the value of the specific information field in the second indication information is an inversion of the value of the specific information field in the first indication information, it may be determined that the UCI is transmitted in the fourth time unit and not transmitted in the third time unit. For example, the value of the specific information field in the first indication information is 1 and the value of the specific information field in the second indication information is 0, at which time, it may be determined that the UCI is transmitted in the fourth time unit and not transmitted in the third time unit.

Sixth Condition

The second time unit and the first time unit are controlled to be time units in a continuous time unit set or a continuous downlink time unit set, so as to indicate the terminal device to transmit the UCI in the fourth time unit and not to transmit the UCI in the third time unit.

That is, the second time unit and the first time unit belong to a same continuous time unit set, wherein the continuous time unit set is a set of time units included in a Channel Occupation Time (COT). Moreover, the continuous time unit set is not necessarily all downlink slots, but may also include an uplink slot.

Of course, the second time unit and the first time unit may also both belong to time units in a continuous downlink time unit set.

In both cases described above, it may be determined that the UCI is transmitted in the fourth time unit, but not in the third time unit.

It should also be pointed out that the first time unit and the second time unit may be a same time unit, or not a same time unit, that is, they are two different time units.

Finally, it should be understood that only one of the above six conditions may be used for setting, or the six conditions may be used in combination for setting, or only part of the conditions may be used for setting, and determination conditions obtained by permutations and combinations thereof are all within the protection scope of the present implementation.

The method further includes: the terminal device is indicated to transmit the UCI in the third time unit, according to a Hybrid Automatic Repeat reQuest (HARQ) time information field in the first indication information; and/or the terminal device is indicated to transmit the UCI in the fourth time unit, according to an HARQ time information field in the second indication information.

Specifically, when it is determined to transmit the UCI in the fourth time unit and not to transmit the UCI in the third time unit based on at least one of the first time unit, the second time unit, the first indication information and the second indication information in the present solution, the terminal device is indicated to determine to transmit the UCI in the fourth time unit only according to the HARQ time information field in the second indication information.

In addition, in actual processing, there may also be the following solutions.

The terminal device is indicated to transmit the UCI in the fourth time unit and also transmit the UCI in the third time unit, based on at least one of the first time unit, the second time unit, the first indication information and the second indication information. That is, if at least one of the first time unit, the second time unit, the first indication information and the second indication information does not satisfy at least one of the aforementioned six determination conditions, it may be determined that UCI is transmitted in the fourth time unit and also in the third time unit. At this time, according to the Hybrid Automatic Repeat reQuest (HARQ) time information field in the first indication information, the terminal device is indicated to transmit the UCI in the third time unit; and according to the HARQ time information field in the second indication information, the terminal device is indicated to transmit the UCI in the fourth time unit.

In another solution, when only the first indication information is received and the second indication information is not received, it is determined to transmit the UCI in the third time unit, according to the Hybrid Automatic Repeat reQuest (HARQ) time information field in the first indication information.

Finally, it should be pointed out that whether the processing in the present implementation is performed may be determined based on whether configuration information by which the network side indicates to enable performing the above function is received. For example, configuration information is sent to the terminal device, and it is determined, based on the configuration information, whether to determine to transmit the UCI in the fourth time unit and not transmit the UCI in the third time unit based on at least one of the first time unit, the second time unit, the first indication information and the second indication information.

Herein, the configuration information may be issued by an RRC or DCI signaling, which is not exhaustively listed here. Herein, a bit may be added to be used for indicating the terminal device whether the above function is enabled, for example, 1 bit may be added for indicating that, and when the bit is set as 1, it is determined to perform the solution provided by the present implementation, otherwise the solution provided by the present implementation is not performed. Of course, it may also be set that the solution provided by the present implementation is performed when the bit is set as 0, otherwise the solution provided by the present implementation is not performed.

Processing is performed in a manner specified in NR Rel15. As shown in FIG. 4, when HARQ-timings corresponding to multiple PDSCHs are a same slot, ACK/NACK information of the multiple PDSCHs is multiplexed and transmitted by one PUCCH, wherein the HARQ-timings are dynamically indicated by DCI. In an NR-U system, after a base station prepares data in advance (DCI and PDSCHs have been determined, processing such as encoding, modulation, or the like, has been performed for the DCI and the PDSCHs and the processed DCI and the PDSCHs wait to be sent), it may be caused due to a LBT failure that corresponding data cannot be transmitted. As shown in the figure, slots corresponding to crosses therein indicate that LBT fails and a transmission is not performed, and K indicates a value of HARQ timing in DCI transmitted within the corresponding slot. The network side originally expects to receive uplink feedback after continuously sending 5 downlink slots. However, due to a LBT failure and preparation of HARQ timing within DCI in advance (assuming that preparation needs to be made in advance by 4 slots), then the base station can only send two DL slots after preempting slot n+3, and then needs to stop a downlink transmission and receive a PUCCH assigned in advance. By the solution provided in the present implementation, the third time unit for transmitting the UCI indicated by the first time unit is adjusted based on the second indication information in the second time unit which is subsequent to the first time unit, and finally it can be determined that the UCI is transmitted only in the fourth time unit indicated in the second indication information, but not in the third time unit any more.

As can be seen, by adopting the present implementation, a fourth time unit in which UCI is transmitted can be re-indicated in second indication information in a second time unit subsequent to a first time unit, and further it can be determined that the UCI is only transmitted in the fourth time unit, but not transmitted in a third time unit, based on at least one of the first time unit, the second time unit, first indication information and the second indication information. In this way, an interruption of a transmission at a terminal or base station side due to a LBT failure can be avoided, continuity of a transmission can be ensured, use efficiency of LBT can be increased and system efficiency can be improved.

Third Implementation

Figure 6:
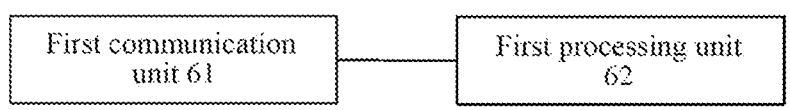
FIG. 6 is a schematic diagram of composition and structure of a terminal device according to an implementation of the present disclosure.

An implementation of the present disclosure provides a terminal device, as shown in FIG. 6, including a first communication unit 61 and a first processing unit 62.

The first communication unit 61 is configured to receive first indication information within a first time unit, wherein the first indication information is used for indicating a terminal to transmit Uplink Control Information (UCI) in a third time unit, and the third time unit is subsequent to the first time unit; and receive second indication information within a second time unit, wherein the second indication information is used for indicating the terminal to transmit the UCI in a fourth time unit, the fourth time unit is subsequent to the second time unit, the second time unit is subsequent to the first time unit or the same as the first time unit, and the fourth time unit is different from the third time unit.

The first processing unit 62 is configured to determine to transmit the UCI in the fourth time unit and not to transmit the UCI in the third time unit, based on at least one of the first time unit, the second time unit, the first indication information, and the second indication information.

Herein, the UCI may be transmitted by a Physical Uplink Control Channel (PUCCH) or by a Physical Uplink Shared Channel (PUSCH). In actual processing, there may also be another transmission channel, which will not be exhaustively listed in the present implementation. The UCI is ACK/NACK information corresponding to downlink data. That is, the UCI is ACK/NACK information corresponding to downlink data received aiming at previous multiple time units.

The first indication information and/or the second indication information is downlink control signaling, which, for example, may be DCI.

The aforementioned determining to transmit the UCI in the fourth time unit and not to transmit the UCI in the third time unit, based on at least one of the first time unit, the second time unit, the first indication information and the second indication information may include at least one of the following determination conditions.

First Determination Condition

The first processing unit 62 determines to transmit the UCI in the fourth time unit and not to transmit the UCI in the third time unit, according to a Downlink Assignment Index (DAI) in the second indication information and the first indication information.

Specifically, the first processing unit 62 adds 1 to a value of the DAI in the first indication information and performs an operation of the value of the DAI plus 1 modulo a first numerical value to obtain a first result; and determines to transmit the UCI in the fourth time unit and not to transmit the UCI in the third time unit, when a value of the DAI in the second indication information is equal to the first result.

Herein, a DAI field is used for telling a UE how many subframes or time units within an HARQ feedback window contain a downlink transmission. In HARQ, this may help the terminal device detect whether downlink DCI is lost. In HARQ multiplexing, DAI may help the UE determine how many bits of ACK/NACK information need to be fed back. That is, by a value of the DAI field, a result obtained by adding the DAI indicated in the first indication information by 1 and then performing an operation of the value of the DAI plus 1 modulo the first numerical value may be known, and when the result is compared with the DAI in the second indication information, if they are same, it represents that the two pieces of indication information have a same content. Therefore, it may be determined that the UCI does not need to be transmitted in the third time unit, but is transmitted only in the fourth time unit.

Further, the first numerical value may be a numerical value preset directly or a numerical value calculated according to a preset formula. Herein, the preset formula may be $A=2^L$, wherein A is the first numerical value and L is a quantity of bits in a DAI information field.

In the present implementation, description is made by taking L=2 as an example, that is, A=4. Referring to FIG. 3A, for example, the value of the DAI in the first indication information is 2 and the value of the DAI in the second indication information is 3, then the DAI in the first indication information plus 1 is 3, 3 modulo 4 is still 3, that is, a calculation result is equal to the DAI in the second indication information, then as shown in the figure, the UCI may be transmitted in the fourth time unit, but not in the third time unit.

In another example, as shown in FIG. 3B, the value of the DAI in the first indication information is 3, 3+1=4, 4 modulo 4 is equal to 0, and the value of the DAI in the second indication information is 0, then the UCI is transmitted in the fourth time unit, but not in the third time unit.

Second Determination Condition

The first processing unit 62 determines to transmit the UCI in the fourth time unit and not to transmit the UCI in the third time unit, when the second time unit is antecedent to the third time unit or the second time unit is the same as the third time unit.

That is, when the second time unit is antecedent to the third time unit indicated in the first indication information, it can be considered that a network side re-issues new indication information, then the UCI only needs to be transmitted in the fourth time unit.

Alternatively, when the second time unit is equal to the third time unit, the UCI is not transmitted in the third time unit.

When the second time unit is antecedent to the third time unit, it is further included that: a time difference between the third time unit and the second time unit is not less than a first threshold.

Herein, a value of the first threshold is related to a processing delay, which is not repeated in the present implementation. For example, if the time at which processing is completed in the second time unit is subsequent to the third time unit, a terminal side will be affected in deciding whether the UCI needs to be sent out in the third time unit.

Therefore, the time difference between the second time unit and the third time unit is required to be not able to be less than the processing delay.

Of course, the value of the first threshold may also use another reference, for example, may be represented by several time units, which will not be exhaustively listed in the present implementation.

Third Determination Condition

The first processing unit 62 determines to transmit the UCI in the fourth time unit and not to transmit the UCI in the third time unit, when a time difference between the second time unit and the first time unit satisfies a predetermined relationship.

Specifically, when the time difference between the second time unit and the first time unit is not greater than a second threshold and/or not less than a third threshold, the first processing unit 62 determines to transmit the UCI in the fourth time unit and not to transmit the UCI in the third time unit.

Herein, the second threshold may be related to one transmission duration. For example, one transmission duration may be L slots, then the second threshold may be L slots. Of course, each transmission duration is not fixed, then a minimum transmission duration may be selected as the second threshold, or an average transmission duration may also be used as the second threshold, which will not be kept on being exhaustively listed here.

Fourth Determination Condition

The first processing unit 62 determines to transmit the UCI in the fourth time unit and not to transmit the UCI in the third time unit, when a channel resource for transmitting the UCI indicated by the second indication information is the same as a channel resource for transmitting the UCI indicated by the first indication information.

Taking transmitting the UCI by using a PUCCH as an example, when a PUCCH resource indicated in the second indication information is the same as a PUCCH resource indicated in the first indication information, the UCI is not transmitted in the third time unit, but only in the fourth time unit.

Herein, the channel resource for transmitting the UCI may include another resource than transmission time units, for example, there may be at least one of a frequency domain resource, a code domain resources, a time domain symbol used within one time unit, or the like.

Fifth Determination Condition

The first processing unit 62 determines to transmit the UCI in the fourth time unit and not to transmit the UCI in the third time unit, when a value of a specific information field in the second indication information is a preset value.

Herein, the specific information field may be set according to an actual situation, and a quantity of bits it contains may also be set according to an actual situation. The quantity of bits may be related to a quantity of indication information. Taking two pieces of indication information as an example, the specific information field may be set to contain only 1 bit.

The preset value may be a value set according to an actual situation. For example, when a value of the specific information field in the second indication information is set to 1, and 1 is the preset value, then the UCI is transmitted in the fourth time unit and not transmitted in the third time unit.

Alternatively, the preset value may be related to a value of a specific information field in the first indication information. For example, when the value of the specific information field in the second indication information is an inversion of the value of the specific information field in the first indication information, it may be determined that the UCI is transmitted in the fourth time unit and not transmitted in the third time unit. For example, the value of the specific information field in the first indication information is 1 and the value of the specific information field in the second indication information is 0, at which time, it may be determined that the UCI is transmitted in the fourth time unit and not transmitted in the third time unit.

Sixth Determination Condition

The first processing unit 62 determines to transmit the UCI in the fourth time unit and not to transmit the UCI in the third time unit, when the second time unit and the first time unit are time units in a continuous time unit set or a continuous downlink time unit set.

That is, the second time unit and the first time unit belong to a same continuous time unit set, wherein the continuous time unit set is a set of time units included in a Channel Occupation Time (COT). Moreover, the continuous time unit set is not necessarily all downlink slots, but may also include an uplink slot.

Of course, the second time unit and the first time unit may also both belong to time units in a continuous downlink time unit set.

In both cases described above, it may be determined that the UCI is transmitted in the fourth time unit, but not in the third time unit.

It should also be pointed out that the first time unit and the second time unit may be a same time unit, or not a same time unit, that is, they are two different time units.

Finally, it should be understood that only one of the above six determination conditions may be used for determination, or the six determination conditions may be used in combination for determination, or only part of the determination conditions may be used for determination, and determination conditions obtained by permutations and combinations thereof are all within the protection scope of the present implementation.

Transmitting the UCI in the fourth time unit and not transmitting the UCI in the third time unit includes: information carried within the UCI transmitted in the fourth time unit including at least part of information carried by the UCI transmitted in the third time unit.

That is, a content of the UCI transmitted in the fourth time unit may be completely the same as a content intended to be transmitted in the third time unit, or a content of the UCI to be transmitted in the fourth time unit may be more than the content of the UCI to be transmitted in the third time unit. For example, when the UCI to be transmitted in the fourth time unit needs to contain feedback information within the previous multiple downlink time units, the content of the UCI to be transmitted in the fourth time unit may be more than a content of information to be fed back in the third time unit, so a content transmitted in the fourth time unit may be more than a content to be transmitted in the third time unit.

The first processing unit 62 determines to transmit the UCI in the third time unit according to a Hybrid Automatic Repeat reQuest (HARQ) time information field in the first indication information; and/or determines to transmit the UCI in the fourth time unit according to an HARQ time information field in the second indication information.

Specifically, when it is determined to transmit the UCI in the fourth time unit and not to transmit the UCI in the third time unit based on at least one of the first time unit, the second time unit, the first indication information and the second indication information in the present solution, it is determined to transmit the UCI in the fourth time unit only according to the HARQ time information field in the second indication information.

In addition, in actual processing, there may also be the following solutions.

It is determined to transmit the UCI in the fourth time unit and also transmit the UCI in the third time unit, based on at least one of the first time unit, the second time unit, the first indication information and the second indication information. That is, if at least one of the first time unit, the second time unit, the first indication information and the second indication information does not satisfy at least one of the aforementioned six determination conditions, it may be determined that the UCI is transmitted in the fourth time unit and also in the third time unit. At this time, according to the Hybrid Automatic Repeat reQuest (HARQ) time information field in the first indication information, it is determined to transmit the UCI in the third time unit; and according to the HARQ time information field in the second indication information, it is determined to transmit the UCI in the fourth time unit.

In another solution, when only the first indication information is received and the second indication information is not received, it is determined to transmit the UCI in the third time unit, according to the Hybrid Automatic Repeat reQuest (HARQ) time information field in the first indication information.

Finally, it should be pointed out that whether the processing in the present implementation is performed may be determined based on whether configuration information in which the network side indicates to perform the above function is received. For example, the first communication unit 61 receives configuration information sent by the network side, and determines, based on the configuration information, whether to determine to transmit the UCI in the fourth time unit and not to transmit the UCI in the third time unit based on at least one of the first time unit, the second time unit, the first indication information and the second indication information.

Herein, the configuration information may be issued by an RRC or DCI signaling, which is not exhaustively listed here. Herein, a bit may be added to be used for indicating the terminal device whether the above function is enabled, for example, 1 bit may be added for indicating, when the bit is set as 1, it is determined to perform the solution provided by the present implementation, otherwise the solution provided by the present implementation is not performed. Of course, it may also be set that the solution provided by the present implementation is performed when the bit is set as 0, otherwise the solution provided by the present implementation is not performed.

As can be seen, by adopting the present implementation, a fourth time unit in which UCI is transmitted can be re-indicated in second indication information in a second time unit subsequent to a first time unit, and further it can be determined that the UCI is only transmitted in the fourth time unit, but not transmitted in a third time unit, based on at least one of the first time unit, the second time unit, first indication information and the second indication information. In this way, an interruption of a transmission at a terminal or base station side due to a LBT failure can be avoided, continuity of a transmission can be ensured, use efficiency of LBT can be increased and system efficiency can be improved.

Implementation IV

Figure 7:
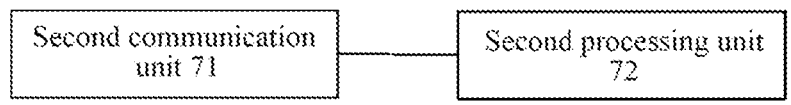
FIG. 7 is a schematic diagram of composition and structure of a network device according to an implementation of the present disclosure.

An implementation of the present disclosure provides a network device, as shown in FIG. 7, including a second communication unit 71 and a second processing unit 72.

The second communication unit 71 is configured to send first indication information to a terminal device within a first time unit, wherein the first indication information is used for indicating the terminal device to transmit UCI in a third time unit, and the third time unit is subsequent to the first time unit; and send second indication information to the terminal device within a second time unit, wherein the second indication information is used for indicating the terminal device to transmit the UCI in a fourth time unit, the fourth time unit is subsequent to the second time unit, the second time unit is subsequent to the first time unit, and the fourth time unit is different from the third time unit.

The second processing unit 72 is configured to determine to indicate the terminal device to transmit the UCI in the fourth time unit and not to transmit the UCI in the third time unit, based on at least one of the first time unit, the second time unit, the first indication information, and the second indication information.

Herein, the UCI may be transmitted by a Physical Uplink Control Channel (PUCCH) or by a Physical Uplink Shared Channel (PUSCH). In actual processing, there may also be another transmission channel, which will not be exhaustively listed in the present implementation. The UCI is ACK/NACK information corresponding to downlink data. That is, the UCI is ACK/NACK information corresponding to downlink data received aiming at previous multiple time units.

The first indication information and/or the second indication information is downlink control signaling, which, for example, may be DCI.

The aforementioned indicating the terminal device to transmit the UCI in the fourth time unit and not to transmit the UCI in the third time unit, based on at least one of the first time unit, the second time unit, the first indication information, and the second indication information may include at least one of the following conditions.

First Condition

The second processing unit 72 determines to indicate the terminal device to transmit the UCI in the fourth time unit and not to transmit the UCI in the third time unit, based on a Downlink Assignment Index (DAI) in the second indication information and the first indication information.

Specifically, the second processing unit 72 adds 1 to a value of the DAI in the first indication information and then performs an operation of the value of the DAI plus 1 modulo a first numerical value to obtain a first result; and sets a value of the DAI in the second indication information to be equal to the first result, so as to indicate the terminal device to transmit the UCI in the fourth time unit and not to transmit the UCI in the third time unit.

Herein, a DAI field is used for telling a UE how many subframes or time units within an HARQ feedback window contain a downlink transmission. In HARQ, this may help the terminal device detect whether downlink DCI is lost. In HARQ multiplexing, DAI may help the UE determine how many bits of ACK/NACK information need to be fed back. That is, by a value of the DAI field, a result obtained by adding the DAI indicated in the first indication information by 1 and then performing an operation of the value of the DAI plus 1 modulo the first numerical value may be known, and when the result is compared with the DAI in the second indication information, if they are same, it represents that the two pieces of indication information have a same content. Therefore, it may be determined that the UCI does not need to be transmitted in the third time unit, but is transmitted only in the fourth time unit.

Further, the first numerical value may be a numerical value preset directly or a numerical value calculated according to a preset formula. Herein, the preset formula may be $A=2^L$, wherein A is the first numerical value and L is a quantity of bits in a DAI information field.

In the present implementation, description is made by taking L=2 as an example, that is, A=4. Referring to FIG. 3A, for example, the value of the DAI in the first indication information is 2 and the value of the DAI in the second indication information is 3, then the DAI in the first indication information plus 1 is 3, 3 modulo 4 is still 3, that is, a calculation result is equal to the DAI in the second indication information, then as shown in the figure, the UCI may be transmitted in the fourth time unit, but not in the third time unit.

In another example, as shown in FIG. 3B, the value of the DAI in the first indication information is 3, 3+1=4, 4 modulo 4 is equal to 0, and the value of the DAI in the second indication information is 0, then the UCI is transmitted in the fourth time unit, but not in the third time unit.

Second Condition

The second processing unit 72 sets the second time unit to be antecedent to the third time unit or the same as the third time unit, so as to determine and indicate the terminal device to transmit the UCI in the fourth time unit and not to transmit the UCI in the third time unit.

That is, when the second time unit is antecedent to the third time unit indicated in the first indication information, it can be considered that a network side re-issues new indication information, then the UCI only needs to be transmitted in the fourth time unit.

Alternatively, when the second time unit is equal to the third time unit, the UCI is not transmitted in the third time unit.

When the second time unit is antecedent to the third time unit, it is further included that: a time difference between the third time unit and the second time unit is not less than a first threshold.

Herein, a value of the first threshold is related to a processing delay, which is not repeated in the present implementation. For example, if the time at which processing is completed in the second time unit is subsequent to the third time unit, a terminal side will be affected in deciding whether the UCI needs to be sent out in the third time unit. Therefore, the time difference between the second time unit and the third time unit is required to be not able to be less than the processing delay.

Of course, the value of the first threshold may also use another reference, for example, may be represented by several time units, which will not be exhaustively listed in the present implementation.

Third Condition

The second processing unit 72 sets a time difference between the second time unit and the first time unit to satisfy a predetermined relationship, so as to determine and indicate the terminal device to transmit the UCI in the fourth time unit and not to transmit the UCI in the third time unit.

Specifically, when the time difference between the second time unit and the first time unit is not greater than a second threshold and/or not less than a third threshold, it is determined to transmit the UCI in the fourth time unit and not to transmit the UCI in the third time unit.

Herein, the second threshold may be related to one transmission duration. For example, one transmission duration may be L slots, then the second threshold may be L slots. Of course, each transmission duration is not fixed, then a minimum transmission duration may be selected as the second threshold, or an average transmission duration may also be used as the second threshold, which will not be kept on being exhaustively listed here.

Fourth Condition

The second processing unit 72 sets a channel resource for transmitting the UCI indicated by the second indication information to be the same as a channel resource for transmitting the UCI indicated by the first indication information, so as to indicate the terminal device to transmit the UCI in the fourth time unit and not to transmit the UCI in the third time unit.

Taking transmitting the UCI by using a PUCCH as an example, when a PUCCH resource indicated in the second indication information is the same as a PUCCH resource indicated in the first indication information, the UCI is not transmitted in the third time unit, but only in the fourth time unit.

Herein, the channel resource for transmitting the UCI may include another resource than transmission time units, for example, there may be at least one of a frequency domain resource, a code domain resource, a time domain symbol used within one time unit, or the like.

Fifth Condition

The second processing unit 72 indicates the terminal device to transmit the UCI in the fourth time unit and not to transmit the UCI in the third time unit, by setting a value of a specific information field in the second indication information to be a preset value.

Herein, the specific information field may be set according to an actual situation, and a quantity of bits it contains may also be set according to an actual situation. A quantity of bits may be related to a quantity of indication information. Taking two pieces of indication information as an example, the specific information field may be set to contain only 1 bit.

The preset value may be a value set according to an actual situation. For example, when a value of the specific information field in the second indication information is set to 1, and 1 is a preset value, then the UCI is transmitted in the fourth time unit and not transmitted in the third time unit.

Alternatively, the preset value may be related to a value of a specific information field in the first indication information. For example, when the value of the specific information field in the second indication information is an inversion of the value of the specific information field in the first indication information, it may be determined that the UCI is transmitted in the fourth time unit and not transmitted in the third time unit. For example, the value of the specific information field in the first indication information is 1 and the value of the specific information field in the second indication information is 0, at which time, it may be determined that the UCI is transmitted in the fourth time unit and not transmitted in the third time unit.

Sixth Condition

The second processing unit 72 controls the second time unit and the first time unit to be time units in a continuous time unit set or a continuous downlink time unit set, so as to indicate the terminal device to transmit the UCI in the fourth time unit and not to transmit the UCI in the third time unit.

That is, the second time unit and the first time unit belong to a same continuous time unit set, wherein the continuous time unit set is a set of time units included in a Channel Occupation Time (COT). Moreover, the continuous time unit set is not necessarily all downlink slots, but may also include an uplink slot.

Of course, the second time unit and the first time unit may also both belong to time units in a continuous downlink time unit set.

In both cases described above, it may be determined that the UCI is transmitted in the fourth time unit, but not in the third time unit.

It should also be pointed out that the first time unit and the second time unit may be a same time unit, or not a same time unit, that is, they are two different time units.

Finally, it should be understood that only one of the above six conditions may be used for setting, or the six conditions may be used in combination for setting, or only part of the conditions may be used for setting, and determination conditions obtained by permutations and combinations thereof are all within the protection scope of the present implementation.

The second processing unit 72 indicates the terminal device to transmit the UCI in the third time unit according to a Hybrid Automatic Repeat reQuest (HARQ) time information field in the first indication information; and/or indicates the terminal device to transmit the UCI in the fourth time unit according to an HARQ time information field in the second indication information.

Specifically, when it is determined to transmit the UCI in the fourth time unit and not to transmit the UCI in the third time unit based on at least one of the first time unit, the second time unit, the first indication information and the second indication information in the present solution, the terminal device is indicated to determine to transmit the UCI in the fourth time unit only according to the HARQ time information field in the second indication information.

In addition, in actual processing, there may also be the following solutions.

The terminal device is indicated to transmit the UCI in the fourth time unit and also transmit the UCI in the third time unit, based on at least one of the first time unit, the second time unit, the first indication information and the second indication information. That is, if at least one of the first time unit, the second time unit, the first indication information and the second indication information does not satisfy at least one of the aforementioned six determination conditions, it may be determined that UCI is transmitted in the fourth time unit and also in the third time unit. At this time, according to the Hybrid Automatic Repeat reQuest (HARQ) time information field in the first indication information, the terminal device is indicated to transmit the UCI in the third time unit; and according to the HARQ time information field in the second indication information, the terminal device is indicated to transmit the UCI in the fourth time unit.

In another solution, when only the first indication information is received and the second indication information is not received, it is determined to transmit the UCI in the third time unit, according to the Hybrid Automatic Repeat reQuest (HARQ) time information field in the first indication information.

Finally, it should be pointed out that whether the processing in the present implementation is performed may be determined based on whether configuration information in which the network side indicates to perform the above function is received. For example, the second communication unit 71 sends configuration information to the terminal device, and determines, based on the configuration information, whether to determine to transmit the UCI in the fourth time unit and not transmit the UCI in the third time unit based on at least one of the first time unit, the second time unit, the first indication information and the second indication information.

Herein, the configuration information may be issued by an RRC or DCI signaling, which is not exhaustively listed here. Herein, a bit may be added for indicating the terminal device whether the above function is enabled, for example, 1 bit may be added for indicating, when the bit is set as 1, it is determined to perform the solution provided by the present implementation, otherwise the solution provided by the present implementation is not performed. Of course, it may also be set that the solution provided by the present implementation is performed when the bit is set as 0, otherwise the solution provided by the present implementation is not performed.

As can be seen, by adopting the present implementation, a fourth time unit in which UCI is transmitted can be re-indicated in second indication information in a second time unit subsequent to a first time unit, and further it can be determined that the UCI is only transmitted in the fourth time unit, but not transmitted in a third time unit, based on at least one of the first time unit, the second time unit, first indication information and the second indication information. In this way, an interruption of a transmission at a terminal or base station side due to a LBT failure can be avoided, continuity of a transmission can be ensured, use efficiency of LBT can be increased and system efficiency can be improved.

Figure 8:
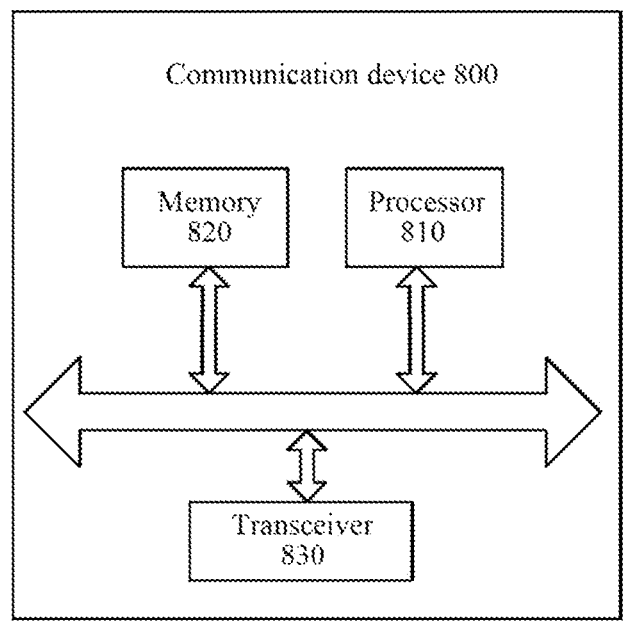
FIG. 8 is a schematic diagram of composition and structure of a communication device according to an implementation of the present disclosure.

FIG. 8 is a schematic diagram of structure of a communication device 800 according to an implementation of the present disclosure. The communication device may be the terminal device or the network device described above in the present implementation. The communication device 800 shown in FIG. 8 includes a processor 810, wherein the processor 810 may call and run a computer program from a memory to implement the method in the implementation of the present disclosure.

Optionally, as shown in FIG. 8, the communication device 800 may further include a memory 820. Herein, the processor 810 may call and run a computer program from the memory 820 to implement the method in the implementation of the present disclosure.

Herein, the memory 820 may be a separate device independent of the processor 810 or may be integrated in the processor 810.

Optionally, as shown in FIG. 8, the communication device 800 may further include a transceiver 830, and the processor 810 may control the transceiver 830 to communicate with another device. Specifically, information or data may be sent to another device, or information or data sent by another device may be received.

Herein, the transceiver 830 may include a transmitter and a receiver. The transceiver 830 may also further include antennas, wherein a quantity of antennas may be one or more.

Optionally, the communication device 800 may be specifically a network device of an implementation of the present disclosure, and the communication device 800 may implement the corresponding flows implemented by the network device in various methods of the implementations of the present disclosure, which will not be repeated here again for brevity.

Optionally, the communication device 800 may be specifically a terminal device or a network device of an implementation of the present disclosure, and the communication device 800 may implement the corresponding flows implemented by the mobile terminal/terminal device in various methods of the implementations of the present disclosure, which will not be repeated here again for brevity.

Figure 9:
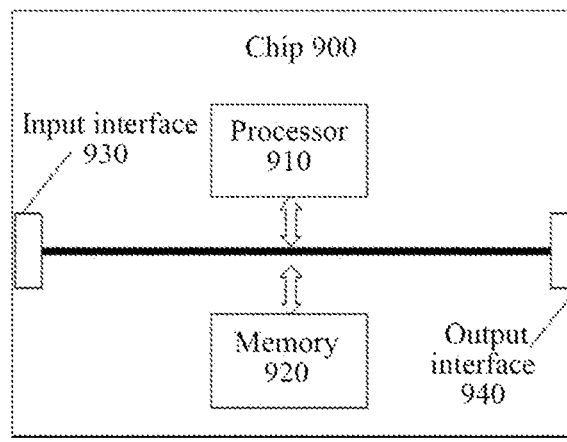
FIG. 9 is a schematic block diagram of a chip according to an implementation of the present disclosure.

FIG. 9 is a schematic diagram of structure of a chip according to an implementation of the present disclosure. A chip 900 shown in FIG. 9 includes a processor 910. The processor 910 may call and run a computer program from a memory to implement the methods in the implementations of the present disclosure.

Optionally, as shown in FIG. 9, the chip 900 may further include a memory 920. Herein, the processor 910 may call and run a computer program from the memory 920 to implement the methods in the implementations of the present disclosure.

Herein, the memory 920 may be a separate device independent of the processor 910 or may be integrated in the processor 910.

Optionally, the chip 900 may further include an input interface 930. Herein, the processor 910 may control the input interface 930 to communicate with another device or chip, and specifically, may acquire information or data sent by another device or chip.

Optionally, the chip 900 may further include an output interface 940. Herein, the processor 910 may control the output interface 940 to communicate with another device or chip, and specifically, may output information or data to another device or chip.

Optionally, the chip may be applied to a network device of an implementation of the present disclosure, and the chip may implement corresponding flows implemented by the network device in various methods of the implementations of the present disclosure, which will not be repeated here again for brevity.

Optionally, the chip may be applied to a terminal device of an implementation of the present disclosure, and the chip may implement corresponding flows implemented by the terminal device in various methods of the implementations of the present disclosure, which will not be repeated here again for brevity.

It should be understood that the chip mentioned in the implementation of the present disclosure may also be referred to as a system-level chip, a system chip, a chip system or a system chip-on-chip, etc.

Figure 10:
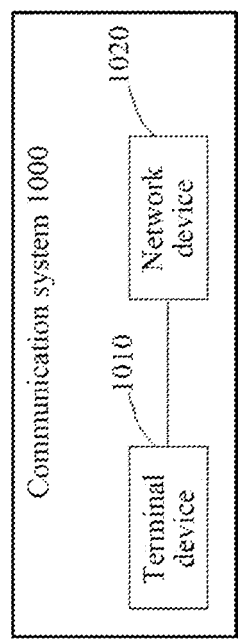
FIG. 10 is a second schematic diagram of architecture of a communication system according to an implementation of the present disclosure.

FIG. 10 is a schematic block diagram of a communication system 1000 according to an implementation of the present disclosure. As shown in FIG. 10, the communication system 1000 includes a terminal device 1010 and a network device 1020.

Herein, the terminal device 1010 may be configured to implement corresponding functions implemented by the terminal device in the above-mentioned methods, and the network device 1020 may be configured to implement corresponding functions implemented by the network device in the above-mentioned methods, which will not be repeated here again for brevity.

It should be understood that the processor in the implementation of the present disclosure may be an integrated circuit chip having a signal processing capability. In an implementation process, the acts of the above method implementations may be accomplished by an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. Various methods, acts and logical block diagrams disclosed in the implementations of the present disclosure may be implemented or executed. The general purpose processor may be a microprocessor, or the processor may be any conventional processor or the like. The acts of the methods disclosed with reference to the implementations of the present disclosure may be directly embodied as being executed and accomplished by a hardware decoding processor, or may be executed and accomplished by a combination of hardware and software modules in the decoding processor. The software modules may be located in a storage medium commonly used in the art, such as a random memory, a flash memory, a read-only memory, a programmable read-only memory or an electrically erasable programmable memory, or a register, etc. The storage medium is located in a memory, and the processor reads information in the memory and accomplishes the acts of the above methods in combination with hardware thereof.

It may be understood that the memory in the implementation of the present disclosure may be a transitory memory or a non-transitory memory, or may include both a transitory memory and a non-transitory memory. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and the methods described herein is intended to include, without being limited to, these and any other suitable types of memories.

It should be understood that the above memories are exemplary but not restrictive illustrations. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), or a Direct Rambus RAM (DR RAM), or the like. That is, memories in the implementations of the present disclosure are intended to include, without being limited to, these and any other suitable types of memories.

An implementation of the present disclosure further provides a computer readable storage medium, configured to store a computer program.

Optionally, the computer readable storage medium may be applied to a network device of an implementation of the present disclosure, and the computer program causes a computer to perform corresponding flows implemented by the network device in various methods of the implementations of the present disclosure, which will not be repeated here again for brevity.

Optionally, the computer readable storage medium may be applied to a terminal device of an implementation of the present disclosure, and the computer program causes a computer to perform corresponding flows implemented by the mobile terminal/terminal device in various methods of the implementations of the present disclosure, which will not be repeated here again for brevity.

An implementation of the present disclosure also provides a computer program product, including computer program instructions.

Optionally, the computer program product may be applied to a network device of an implementation of the present disclosure, and the computer program instructions cause a computer to perform corresponding flows implemented by the network device in various methods of the implementations of the present disclosure, which will not be repeated here again for brevity.

Optionally, the computer program product may be applied to a mobile terminal/terminal device of an implementation of the present disclosure, and the computer program instructions cause a computer to perform corresponding flows implemented by the mobile terminal/terminal device in various methods of the implementations of the present disclosure, which will not be repeated here again for brevity.

An implementation of the present disclosure also provides a computer program.

Optionally, the computer program may be applied to a network device of an implementation of the present disclosure. When being run on a computer, the computer program causes the computer to perform corresponding flows implemented by the network device in various methods of the implementations of the present disclosure, which will not be repeated here again for brevity.

Optionally, the computer program may be applied to a mobile terminal/terminal device of an implementation of the present disclosure. When being run on a computer, the computer program causes the computer to perform corresponding flows implemented by the mobile terminal/terminal device in various methods of the implementations of the present disclosure, which will not be repeated here again for brevity.

Those of ordinary skills in the art may recognize that the exemplary units and algorithm acts described in combination with the implementations disclosed herein can be implemented in electronic hardware, or a combination of computer software and electronic hardware. Whether these functions are actually performed in hardware or software depends on a specific application and design constraint conditions of the technical solutions. Professional technicians may use different methods to implement the described functions in respect to each specific application, but such implementation should not be considered to be beyond the scope of the present disclosure.

Those skilled in the art may clearly learn that for convenience and conciseness of description, as to specific working processes of the systems, apparatuses and units described above, reference may be made to the corresponding processes in the aforementioned method implementations, which will not be repeated here again.

In several implementations provided by the present disclosure, it should be understood that the disclosed systems, apparatuses and methods may be implemented in other ways. For example, the apparatus implementations described above are only illustrative, for example, the division of the units is only a logical function division, and there may be another division manner in an actual implementation, for example, multiple units or components may be combined or may be integrated into another system, or some features may be ignored or not performed. At the other point, mutual coupling or direct coupling or a communication connection shown or discussed may be indirect coupling or a communication connection through some interfaces, apparatuses or units, and may be in electrical, mechanical or another form.

The unit described as a separate component may or may not be physically separated, and the component shown as a unit may or may not be a physical unit, i.e., it may be located in one place or may be distributed over multiple network units. Part or all of the units thereof may be selected according to an actual need to achieve the purpose of the solutions of the present implementations.

In addition, various functional units in various implementations of the present disclosure may be integrated in one processing unit, or the various units may be physically present separately, or two or more units may be integrated in one unit.

The functions may be stored in a computer readable storage medium, if realized in a form of software functional units and sold or used as a separate product. Based on this understanding, the technical solution of the present disclosure, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present disclosure. And the storage medium includes various media which may store program codes, such as a USB flash disk, a removable hard disk, a Read-Only Memory (ROM), a Random Access Memory (RAM), a magnetic disk, or an optical disk, etc.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for determining a feedback time sequence, applied to a terminal device, comprising:
   receiving first indication information within a first time unit, wherein the first indication information is used for indicating the terminal device to transmit Uplink Control Information (UCI) in a third time unit, and the third time unit is subsequent to the first time unit;
   receiving second indication information within a second time unit, wherein the second indication information is used for indicating the terminal device to transmit the UCI in a fourth time unit, the fourth time unit is subsequent to the second time unit, the second time unit is subsequent to the first time unit or the same as the first time unit, and the fourth time unit is different from the third time unit; and
   determining to transmit the UCI in the fourth time unit and not to transmit the UCI in the third time unit, based on at least one of the first time unit, the second time unit, the first indication information, and the second indication information,
   wherein determining to transmit the UCI in the fourth time unit and not to transmit the UCI in the third time unit, based on at least one of the first time unit, the second time unit, the first indication information and the second indication information, comprises:
   determining to transmit the UCI in the fourth time unit and not to transmit the UCI in the third time unit, when a value of a specific information field in the second indication information is a preset value,
   wherein the method further comprises:
   determining to transmit the UCI in both the fourth time unit and the third time unit, when the value of the specific information field in the second indication information is not the preset value; and
   receiving configuration information sent by a network side, wherein the configuration information is used for indicating to the terminal device whether to enable to determine to transmit the UCI in the fourth time unit and not to transmit the UCI in the third time unit, based on at least one of the first time unit, the second time unit, the first indication information, and the second indication information,
   wherein determining to transmit the UCI in the fourth time unit and not to transmit the UCI in the third time unit, based on at least one of the first time unit, the second time unit, the first indication information, and the second indication information comprises:
   determining, based on the configuration information, to transmit the UCI in the fourth time unit and not to transmit the UCI in the third time unit based on at least one of the first time unit, the second time unit, the first indication information and the second indication information.

2. The method of claim 1, wherein determining to transmit the UCI in the fourth time unit and not to transmit the UCI in the third time unit, based on at least one of the first time unit, the second time unit, the first indication information and the second indication information, further comprises at least one of the followings:
   determining to transmit the UCI in the fourth time unit and not to transmit the UCI in the third time unit, according to a Downlink Assignment Index (DAI) in the second indication information and the first indication information;
   determining to transmit the UCI in the fourth time unit and not to transmit the UCI in the third time unit, when the second time unit is antecedent to the third time unit or the second time unit is the same as the third time unit;
   determining to transmit the UCI in the fourth time unit and not to transmit the UCI in the third time unit, when a time difference between the second time unit and the first time unit satisfies a predetermined relationship;
   determining to transmit the UCI in the fourth time unit and not to transmit the UCI in the third time unit, when a channel resource for transmitting the UCI indicated by the second indication information is the same as a channel resource for transmitting the UCI indicated by the first indication information; and
   determining to transmit the UCI in the fourth time unit and not to transmit the UCI in the third time unit, when the second time unit and the first time unit are time units in a continuous time unit set or a continuous downlink time unit set, wherein the continuous time unit set is a set of time units contained in a Channel Occupation Time (COT).

3. The method of claim 2, wherein determining to transmit the UCI in the fourth time unit and not to transmit the UCI in the third time unit, according to the Downlink Assignment Index (DAI) in the second indication information and the first indication information comprises:
adding 1 to a value of the DAI in the first indication information and then performing an operation of the value of the DAI plus 1 modulo a first numerical value to obtain a first result; and
determining to transmit the UCI in the fourth time unit and not to transmit the UCI in the third time unit, when a value of the DAI in the second indication information is equal to the first result.

4. The method of claim 2, wherein when the second time unit is antecedent to the third time unit, a time difference between the third time unit and the second time unit is not less than a first threshold.

5. The method of claim 2, wherein determining to transmit the UCI in the fourth time unit and not to transmit the UCI in the third time unit, when the time difference between the second time unit and the first time unit satisfies the predetermined relationship comprises:
determining to transmit the UCI in the fourth time unit and not to transmit the UCI in the third time unit, when the time difference between the second time unit and the first time unit is not greater than a second threshold and/or not less than a third threshold.

6. The method of claim 1, wherein transmitting the UCI in the fourth time unit and not transmitting the UCI in the third time unit comprises:
containing at least part of information carried by the UCI transmitted in the third time unit into information carried within the UCI transmitted in the fourth time unit.

7. The method of claim 1, wherein the first indication information and/or the second indication information is downlink control signaling.

8. The method of claim 1, wherein the method further comprises:
determining to transmit the UCI in the third time unit, according to a Hybrid Automatic Repeat reQuest (HARQ) time information field in the first indication information; and/or
determining to transmit the UCI in the fourth time unit, according to an HARQ time information field in the second indication information.

9. The method of claim 1, wherein
the UCI is ACK/NACK information corresponding to downlink data.

10. A network device, comprising: a processor and a transceiver,
wherein the transceiver is configured to:
send first indication information to a terminal device within a first time unit, wherein the first indication information is used for indicating the terminal device to transmit Uplink Control Information (UCI) in a third time unit, and the third time unit is subsequent to the first time unit; and
send second indication information to the terminal device within a second time unit, wherein the second indication information is used for indicating the terminal device to transmit the UCI in a fourth time unit, the fourth time unit is subsequent to the second time unit, the second time unit is subsequent to the first time unit, and the fourth time unit is different from the third time unit,
wherein the processor is configured to:
set a value of a specific information field in the second indication information to be a preset value, to indicate the terminal device to transmit the UCI in the fourth time unit and not to transmit the UCI in the third time unit; and
set the value of the specific information field in the second indication information not to be the preset value, to indicate the terminal device to transmit the UCI in both the fourth time unit and the third time unit,
wherein the transceiver is further configured to:
send configuration information to the terminal device, wherein the configuration information is used for indicating the terminal device whether to enable to determine to transmit the UCI in the fourth time unit and not to transmit the UCI in the third time unit based on at least one of the first time unit, the second time unit, the first indication information and the second indication information,
wherein the processor is further configured to:
indicate, based on the configuration information, the terminal device to transmit the UCI in the fourth time unit and not to transmit the UCI in the third time unit, based on at least one of the first time unit, the second time unit, the first indication information, and the second indication information.

11. A terminal device, comprising: a processor and a transceiver,
wherein the transceiver is configured to receive first indication information within a first time unit, wherein the first indication information is used for indicating the terminal device to transmit Uplink Control Information (UCI) in a third time unit, and the third time unit is subsequent to the first time unit; and receive second indication information within a second time unit, wherein the second indication information is used for indicating the terminal device to transmit the UCI in a fourth time unit, wherein the fourth time unit is subsequent to the second time unit, the second time unit is subsequent to the first time unit or the same as the first time unit, and the fourth time unit is different from the third time unit,
wherein the processor is configured to:
determine to transmit the UCI in the fourth time unit and not to transmit the UCI in the third time unit, when a value of a specific information field in the second indication information is a preset value; and
determine to transmit the UCI in both the fourth time unit and the third time unit, when the value of the specific information field in the second indication information is not the preset value,
wherein the transceiver is further configured to:
receive configuration information sent by a network side, wherein the configuration information is used for indicating to the terminal device whether to enable to determine to transmit the UCI in the fourth time unit and not to transmit the UCI in the third time unit, based on at least one of the first time unit, the second time unit, the first indication information, and the second indication information,
wherein the processor is further configured to:
determine, based on the configuration information, to transmit the UCI in the fourth time unit and not to transmit the UCI in the third time unit based on at least one of the first time unit, the second time unit, the first indication information and the second indication information.

12. The terminal device of claim 11, wherein the processor is further configured to perform at least one of the followings:
   determining to transmit the UCI in the fourth time unit and not to transmit the UCI in the third time unit, according to a Downlink Assignment Index (DAI) in the second indication information and the first indication information;
   determining to transmit the UCI in the fourth time unit and not to transmit the UCI in the third time unit, when the second time unit is antecedent to the third time unit or the second time unit is the same as the third time unit;
   determining to transmit the UCI in the fourth time unit and not to transmit the UCI in the third time unit, when a time difference between the second time unit and the first time unit satisfies a predetermined relationship;
   determining to transmit the UCI in the fourth time unit and not to transmit the UCI in the third time unit, when a channel resource for transmitting the UCI indicated by the second indication information is the same as a channel resource for transmitting the UCI indicated by the first indication information; and
   determining to transmit the UCI in the fourth time unit and not to transmit the UCI in the third time unit, when the second time unit and the first time unit are time units in a continuous time unit set or a continuous downlink time unit set,
   wherein the continuous time unit set is a set of time units contained in a Channel Occupation Time (COT).

13. The terminal device of claim 12, wherein the processor is configured to add 1 to a value of the DAI in the first indication information and then perform an operation of the value of the DAI plus 1 modulo a first numerical value to obtain a first result; and determine to transmit the UCI in the fourth time unit and not to transmit the UCI in the third time unit, when a value of the DAI in the second indication information is equal to the first result.

14. The terminal device of claim 12, wherein when the second time unit is antecedent to the third time unit, a time difference between the third time unit and the second time unit is not less than a first threshold.

15. The terminal device of claim 12, wherein when the time difference between the second time unit and the first time unit is not greater than a second threshold and/or not less than a third threshold, the processor is configured to determine to transmit the UCI in the fourth time unit and not to transmit the UCI in the third time unit.

16. The terminal device of claim 11, wherein information carried within the UCI transmitted in the fourth time unit contains at least part of information carried by the UCI transmitted in the third time unit.

17. The terminal device of claim 11, wherein the processor is configured to determine to transmit the UCI in the third time unit, according to a Hybrid Automatic Repeat reQuest (HARQ) time information field in the first indication information; and/or
   determine to transmit the UCI in the fourth time unit, according to an HARQ time information field in the second indication information.

* * * * *